United States Patent

[11] 3,624,023

[72] Inventor James V. Hartlage
 Midland, Mich.
[21] Appl. No. 27,170
[22] Filed Apr. 9, 1970
[45] Patented Nov. 30, 1971
[73] Assignee Dow Corning Corporation
 Midland, Mich.

[54] TRANSPARENT SILICONE RUBBER VULCANIZABLE UNDER AMBIENT CONDITIONS
3 Claims, No Drawings

[52] U.S. Cl. .................................................. 260/37 SB
[51] Int. Cl. ............................................. C08g 51/04
[50] Field of Search ....................................... 260/37 SB

[56] References Cited
UNITED STATES PATENTS

| | | | |
|---|---|---|---|
| 2,843,555 | 7/1958 | Berridge | 260/37 SB UX |
| 3,243,404 | 3/1966 | Martellock | 260/37 SB |
| 3,532,664 | 10/1970 | Smith | 260/37 SB |

Primary Examiner—Lewis T. Jacobs
Attorneys—Robert F. Fleming, Jr., Laurence R. Hobey, Harry D. Dingman and Roger H. Borrousch ABSTRACT: A mixture of a fume silica treated with bis(trimethyl-silyl)amine, a hydroxyl endblocked phenyl methyl polysiloxane, and alkoxy silicon compound and a curing catalyst cure at ambient conditions to a transparent silicone rubber useful as an encapsulant for electrical components.

TRANSPARENT SILICONE RUBBER VULCANIZABLE UNDER AMBIENT CONDITIONS

This invention relates to a silicone rubber, transparent and vulcanizable at ambient conditions.

A number of silicone rubber compositions which are transparent are known in the silicone rubber art. Many of these compositions have been developed for specific uses, such as the contact lens. Transparent silicone potting compositions and encapsulants vulcanizable at ambient conditions prepared from mixing a silicon compound containing silicon-bonded hydrogen atoms and a vinyl containing organo-silicon polymer in the presence of a platinum catalyst are known in the art for use in the electronic industry. These compositions, however, have the disadvantage that many of the materials used in the electronic industry inhibit the cure. The composition of the present invention overcomes this disadvantage.

A transparent silicone rubber is described by Daudt in U.S. Pat. No. 3,036,985 and consists essentially of an organopolysiloxane of at least 50 mol. percent dimethylsiloxane units and a filler which is a certain copolymer composed of $RSiO_{3/2}$, $(CH_3)_2SiO$, $(CH_3)_3SiO_{0.5}$ and $SiO_2$ units. This composition can be cured at room temperature by adding a polyalkoxysilicate and a catalyst. Daudt uses the special copolymer filler, since both modified and unmodified silica fillers produce opaque silicone rubbers. The present invention is an improvement over the composition described by Daudt in that no special copolymer is required and a conventional fume silica can be used after receiving a treatment to provide a hydrophobic surface.

A transparent silicone potting composition is described by Modic in U.S. Pat. No. 3,457,214 and consists essentially of a silanol terminated polydiorganosiloxane in which 11 to 13.3 percent of the organic groups are phenyl and the rest are methyl, a resinous copolymer of trimethylsiloxane units and $SiO_2$ units and a reinforcing silica filler. Modic found that it was necessary to use a certain resinous copolymer as crosslinkers in order to use a reinforcing silica in obtaining a cured transparent product. The present invention has unexpectedly found that the resinous copolymer of Modic is not required to provide a transparent silicone rubber when a fume silica is treated with bis(trimethylsilyl)amine.

It is an object of the present invention to provide a composition which vulcanizes at ambient conditions to a transparent silicone rubber. This and other objects will become apparent from the following detailed description.

This invention relates to a silicone rubber composition vulcanizable at ambient conditions consisting essentially of (A) from one to 50 parts by weight of a reinforcing fume silica having a surface area of from 100 to 500 square meters per gram, the surface of said silica having been treated with bis(trimethylsilyl)amine to provide from 3.5 to 7 weight percent carbon based on the total weight of treated silica, (B) 100 parts by weight of a hydroxyl endblocked phenyl methyl polysiloxane having from 15 to 45 mol percent phenylsiloxane units selected from the group consisting of diphenylsiloxane units and phenylmethylsiloxane units and any remaining units being dimethylsiloxane units, said phenyl methyl polysiloxane having a viscosity from 1,000 to 100,000 cs. at 25° C. inclusive, (C) from 0.5 to 10 parts by weight of an alkoxy silicon compound selected from the group consisting of tetra-alkoxysilane and alkoxypolysilicate wherein each alkoxy group has from 1 to 5 inclusive carbon atoms, and (D) a curing catalyst for the composition.

The reinforcing fume silica of (A) can be any of the conventional fume silicas which are readily available commercially and which have a surface area of from 100 to 500 square meters per gram. These fume silicas are treated to provide a hydrophobic silica with from 3.5 to 7 weight percent carbon based on the weight of the treated silica. One method for treating the fume silica with bis(trimethylsilyl)amine is to mix the fume silica and the bis(trimethylsilyl)amine in the presence of a small amount of water. The bis(trimethylsilyl)amine is preferably present in an amount in excess of that necessary to provide a hydrophobic silica with from 3.5 to 7 weight percent carbon. The temperature during treatment can vary broadly including room temperature. The treated reinforcing fume silica can be present in an amount of from 1 to 50 parts by weight per 100 parts of (B). Preferably, the treated reinforcing fume silica is present in an amount of from 10 to 35 parts by weight per 100 parts of (B).

The hydroxyl endblocked phenyl methyl polysiloxane, (B), is a polydiorganosiloxane containing phenylmethylsiloxane units or diphenylsiloxane units and dimethylsiloxane units wherein any other units are present in only trace amounts such as less than one mol percent. The phenylmethylsiloxane units or diphenylsiloxane units are present in an amount of from 15 to 45 mol. percent and the remaining units are dimethylsiloxane units. Preferably, the phenylmethylsiloxane units or the diphenylsiloxane units are present in an amount of from 20 to 30 mol percent. The hydroxyl endblocked phenyl methyl polysiloxanes, (B), have a viscosity of from 1,000 to 100,000 cs. at 25° C., preferably from 1,500 to 40,000 cs. at 25° C. The hydroxyl endblocked phenyl methyl polysiloxane can be a copolymer, a mixture of copolymers, or a mixture of polydimethylsiloxane and a phenyl containing copolymer such as hydroxyl endblocked polyphenylmethylsiloxane, as long as the mol percent of phenylmethylsiloxane units or diphenylsiloxane units provide the required amount in the total mixture.

The alkoxy silicon compounds, (C), can be tetra-alkoxysilanes or the partial hydrolyzates thereof known as alkoxy polysilicates. The alkoxy groups can have from 1 to 5 carbon atoms per group and can be illustrated by methoxy, ethoxy, n-propoxy, isopropoxy, n-butoxy, isobutoxy and amyloxy. These alkoxy silicon compounds are well known in the art and the tetra-alkoxysilanes can be illustrated by tetra-ethoxysilane, tetra-n-propoxysilane, tetra-butoxysilane, tetra-amyloxysilane and the various partial hydrolyzates, such as ethylpolysilicate and n-propoxypoly silicate. Preferably the alkoxy groups are ethoxy or propoxy. The amount of the alkoxy silicon compound can be from 0.5 to 10 parts be weight per 100 parts by weight of (B), preferably from 2 to 6 parts by weight per 100 parts be weight of (B).

The compositions of the present invention can be cured by any of the conventional catalysts used in curing the alkoxy-hydroxyl. The curing catalyst can be illustrated by the condensation product of an aliphatic aldehyde and an aliphatic primary amine as described in U.S. Pat. No. 2,833,742 which is hereby incorporated by reference and by the metallic salt of an organic monocarboxylic acid where the metal can be lead, tin, zirconium, antimony, iron, cadmium, barium, calcium, titanium, bismuth or manganese such as dibutyltindilaurate, dibutyltindiacetate and stannouse octoate as described by U.S. Pat. No. 2,843,555 and U.S. Pat. No. 2,927,907, which are hereby incorporated by reference. The amount of curing catalyst, (C) is the amount conventionally used to cure the composition as described in the art, such as 0.01 to 10 weight percent.

The compositions of the present invention vulcanize at ambient conditions when all the ingredients are mixed. The mixture of all the ingredients, however, can be stored at low temperatures, such as −20° C. It is preferred, however, to package the ingredients in two containers, such as a mixture of the treated reinforcing fume silica and the hydroxyl endblocked phenyl methyl polysiloxane in one package and a mixture of the alkoxy silicon compound and the curing catalyst in another package. When the compositions are to be used the contents of the two packages are mixed and vulcanization takes place at ambient conditions. The mixture can also be heated to accelerate the cure. The present invention does not exclude the use of inert diluents such as polydimethylsiloxane fluids and organic solvents. Materials which produce haze, however, should be avoided.

The compositions of the present invention cure to transparent silicone rubber which finds use in encapsulating electrical components, thus enabling a worker to see a defective part and repairing that part without removing all the encapsulant from the surrounding electrical components. Furthermore, the cure of the composition of this invention is not inhibited by various substrates found in electrical equipment which occurs when platinum catalysts are used.

The following examples are presented for illustrative purposes only and should not be construed as limiting the present invention which is properly delineated in the claims.

EXAMPLE 1

Transparent silicone rubbers were obtained when a mixture of 100 parts by weight of a hydroxyl endblocked phenyl methyl polysiloxane as described below, 25 parts by weight of a reinforcing fume silica having a surface area of 170 square meters per gram treated with hexamethyldisilazane and a small amount of water providing the silica with a carbon content from 3.5 to 7 weight percent, 3 parts by weight of ethylpolysilicate and 1 part by weight of dibutyltindilaurate was exposed to ambient conditions. The phenyl methyl polysiloxanes were A. a polysiloxane having 30 mol percent phenylmethylsiloxane units and 70 mol percent dimethylsiloxane units and having a viscosity of 25,200 cs. at 25° C.

B. a polysiloxane having 30 mol. percent phenylmethylsiloxane units and 70 mol percent dimethylsiloxane units and having a viscosity of 1950 cs. at 25° C.

C. a polysiloxane having 15 mol percent diphenylsiloxane and 85 mol percent dimethylsiloxane units and having a viscosity of 2480 cs. at 25° C.

D. a polysiloxane having 44 mol percent phenylmethylsiloxane units and 56 mol percent dimethylsiloxane units and having a viscosity of 2580 cs. at 25° C.

EXAMPLE 2

A mixture of 100 parts by weight of a hydroxyl endblocked phenyl methyl polysiloxane having 30 mol percent phenylmethylsiloxane units and 70 mol percent dimethylsiloxane units and having a viscosity of 6150 cs. at 25° C., 15 parts by weight of the reinforcing fume silica defined in example 1, 3 parts by weight of ethylpolysilicate and 1 part by weight of dibutyltindilaurate was exposed to moisture under ambient conditions and cured to a transparent silicone rubber of excellent clarity.

EXAMPLE 3

For purposes of comparison a mixture of 100 parts by weight of a hydroxyl endblocked phenyl methyl polysiloxane having 30 mol. percent diphenylsiloxane units and 70 mol. percent dimethylsiloxane units and having a viscosity of 8020 cs. at 25° C., 15 parts by weight of a reinforcing fume silica having a surface area of 170 square meters per gram treated as described in example 1 but having about 3 weight percent carbon, 3 parts by weight ethylpolysilicate and 1 part by weight dibutyltindilaurate was exposed to moisture under ambient conditions and cured to an opaque silicone rubber.

We claim:

1. A silicone rubber composition vulcanizable at ambient conditions prepared by mixing the ingredients consisting essentially of A. from 1 to 50 parts by weight of a reinforcing fume silica having a surface area of from 100 to 500 square meters per gram, the surface of said silica having been treated with bis(trimethylsilyl)amine to provide from 3.5 to 7 weight percent carbon based on the total weight of treated silica, B. 100 parts by weight of a hydroxyl endblocked phenyl methyl polysiloxane having from 15 to 15 mol percent phenylmethylsiloxane units and any remaining units being dimethylsiloxane units, said phenyl methyl polysiloxane having a viscosity from 1,000 to 100,000 cs. at 25° C. inclusive, C. from 0.5 to 10 parts by weight of an alkoxy silicon compound selected from the group consisting of tetraalkoxysilane and alkoxypolysilicate wherein each alkoxy group has from 1 to 5 inclusive carbon atoms, and D. a curing catalyst for the composition.

2. The silicone rubber composition in accordance with claim 1 in which the reinforcing fume silica is present in an amount of from 10 to 35 parts by weight, the viscosity of the hydroxyl endblocked phenyl methyl polysiloxane is from 1,500 to 40,000 cs. at 25° C. and the alkoxy silicon compound is present in an amount of from 2 to 6 parts by weight.

3. The composition of claim 1 cured by exposure to moisture to a transparent silicone rubber.

* * * * *